（12） United States Patent
Matthews (10) Patent No.: US 9,360,120 B2
(45) Date of Patent: Jun. 7, 2016

(54) VALVE PLUG FOR PRESSURE REGULATOR (71) Applicant: EMERSON PROCESS MANAGEMENT REGULATOR TECHNOLOGIES, INC., McKinney, TX (US)

(72) Inventor: Kunrong Matthews, Carrollton, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 0 days.

(21) Appl. No.: 14/528,701

(22) Filed: Oct. 30, 2014

(65) Prior Publication Data
US 2015/0122352 A1   May 7, 2015

Related U.S. Application Data (60) Provisional application No. 61/898,738, filed on Nov. 1, 2013.

(51) Int. Cl.
*F16K 1/46* (2006.01)
*F16K 47/04* (2006.01)
*G05D 16/18* (2006.01)
*F16K 1/34* (2006.01)

(52) U.S. Cl.
CPC ... *F16K 1/46* (2013.01); *F16K 1/34* (2013.01); *F16K 47/04* (2013.01); *G05D 16/185* (2013.01); *Y10T 137/7793* (2015.04)

(58) Field of Classification Search
CPC ............. F16K 1/46; F16K 47/04; F16K 1/34; G05D 16/185; Y10T 137/7793
USPC .................................................. 251/332, 334
See application file for complete search history.

(56) References Cited

U.S. PATENT DOCUMENTS 2,924,233 A * 2/1960 Michaels ................ F16K 41/12
                                                      251/330
3,324,880 A * 6/1967 Roberts ............... F04B 53/1025
                                                     137/516.29

(Continued)

OTHER PUBLICATIONS

International Search Report and Written Opinion for International Application No. PCT/US2014/063622, mailed Mar. 12, 2015.

(Continued)

*Primary Examiner* — John Bastianelli
(74) *Attorney, Agent, or Firm* — Marshall, Gerstein & Borun LLP (57) ABSTRACT

A valve plug comprising a cylindrical body having an annular flange with a top surface, a bottom surface, and a circumference is disclosed. The valve plug further comprises an annular recess disposed in the bottom surface of the flange, and a plurality of holes disposed in the top surface of the flange. Each hole extends into the recess to create a plurality of channels extending between the bottom and top surfaces of the flange. Each channel of the plurality of channels includes a stepped portion. A polyurethane sealing member is disposed within each channel and includes: a top portion forming a continuous bond on the top surface and along the circumference of the flange; a central portion forming a horizontal bond on each stepped portion; and a bottom portion forming a sealing surface adapted to sealingly engage a seating surface of the seat.

20 Claims, 5 Drawing Sheets

(56) References Cited

U.S. PATENT DOCUMENTS

| | | | | |
|---|---|---|---|---|
| 5,503,366 | A | * | 4/1996 | Zabeck ............... F16K 31/0606 251/129.15 |
| 5,560,585 | A | * | 10/1996 | Krimmer ........... F02M 25/0836 251/129.15 |
| 7,275,732 | B2 | * | 10/2007 | Kato ................... F16K 31/0655 251/358 |
| 7,441,560 | B2 | * | 10/2008 | Sonoda ..................... F16K 1/36 137/375 |
| 2009/0065073 | A1 | | 3/2009 | Davis |
| 2010/0269925 | A1 | | 10/2010 | Roper et al. |
| 2013/0000756 | A1 | | 1/2013 | Griffin, Jr. et al. |

OTHER PUBLICATIONS

Emerson Process Management, EZH and EZHSO Series Pressure Reducing Regulators, Bulletin 71.2:EZH and EZHSO, Aug. 2013, 28 pages, www.fisherregulators.com, US.

* cited by examiner

VALVE PLUG FOR PRESSURE REGULATOR

FIELD OF THE DISCLOSURE

The present disclosure generally relates to fluid control devices and, more particularly, to control member assemblies for fluid control devices.

BACKGROUND

Figure 1:
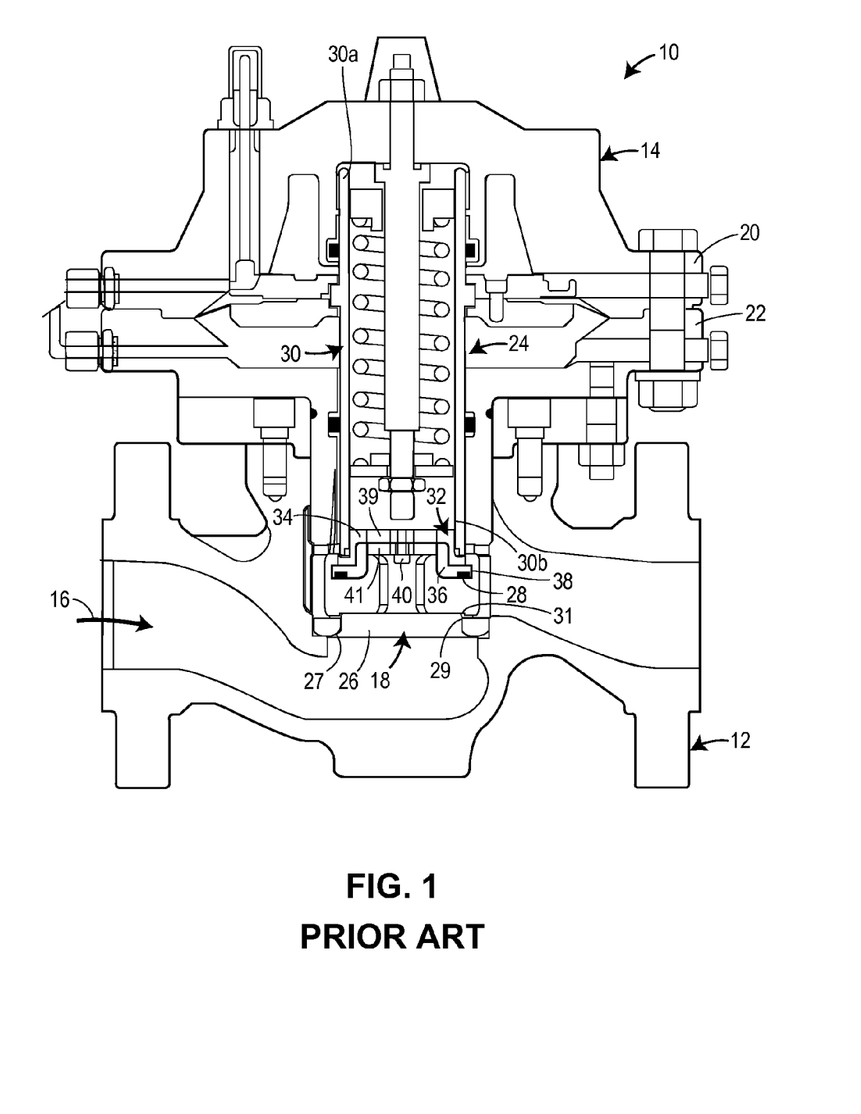
FIG. 1 is a cross-sectional side view of a regulator assembly including a known valve plug and sealing disk.

Fluid control devices include various categories of equipment including control valves and regulators. Such control devices are adapted to be coupled within a fluid process control system such as chemical treatment systems, natural gas delivery systems, etc., for controlling the flow of a fluid therethrough. Each control device defines a fluid flow-path and includes a control member for adjusting a dimension of the flow-path. For example, FIG. 1 depicts a known regulator assembly 10 including a valve body 12 and an actuator 14. The valve body 12 defines a flow-path 16 and includes a throat 18. In FIG. 1, the regulator assembly 10 is configured in a flow-up configuration. The actuator 14 includes an upper actuator casing 20, a lower actuator casing 22, and a control member assembly 24. The control member assembly 24 is disposed within the upper and lower actuator casings 20, 22 and is adapted for bi-directional displacement in response to changes in pressure across the regulator assembly 10. So configured, the control member assembly 24 controls the flow of fluid through the throat 18. Additionally, as is depicted, the regulator assembly 10 includes a seat ring 26 disposed in the throat 18 of the valve body 12. When the outlet pressure of the valve body 12 is high, a sealing surface 28 of the control member assembly 24 may sealingly engage the seat ring 26 and close the throat 18. This prevents the flow of fluid through the regulator 10.

The seat ring 26 depicted in FIG. 1 further includes a rounded or tapered surface 27. The rounded or tapered surface 27 serves to streamline the flow of the fluid through an orifice 29. As fluid flows through the valve body 12, it flows from the left of the valve body 12, as depicted in FIG. 1 and up through the throat 18 via the orifice 32 in the seat ring 26. Then, the fluid deflects off a lower surface of the control member 24 including the sealing surface 28, and out to the right of the valve body 12 of FIG. 1.

FIG. 1 depicts the regulator assembly 10 equipped with one known control member assembly 24. As mentioned, and in general, the control member assembly 24 includes the sealing surface 28 that is adapted to be engaged by a seating surface 31 of the seat ring 26 when the control member assembly 24 is in a closed position, preventing the fluid from flowing through the valve body 12. More specifically, the control member assembly 24 further includes a tubular member 30 and a mounting subassembly 32. The tubular member 30 includes an upper end 30a and a lower end 30b that is open and accommodates the mounting subassembly 32. The mounting subassembly 32 further includes a mounting member 34, a plug or a disk holder 36 and a sealing disk 38 having the sealing surface 28. The mounting member 34 includes a generally cylindrical body threaded into the open lower end 30b of the tubular member 30 and defining at least one through-bore 39. The disk holder 36 also includes a generally cylindrical body 37 (FIG. 3) that is fixed to the mounting member 34 with a fastener 40. In the form illustrated, the fastener 40 includes a threaded fastener. Similar to the mounting member 34, the disk holder 36 also includes at least one through-bore 41 that is axially aligned with the at least one through-bore 39 of the mounting member 34. In addition, the at least one through-bore 39 of the mounting member 34 has a diameter substantially identical to the at least one through-bore 41 of the disk holder 36.

Figure 2:
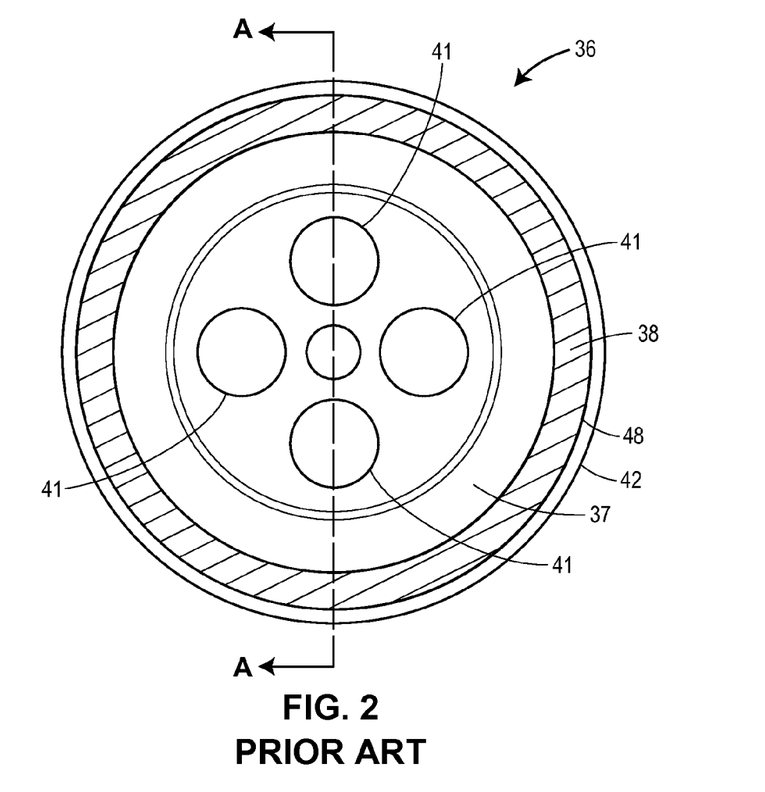
FIG. 2 is a top view of the known valve plug and sealing disk of FIG. 1.
Figure 3:
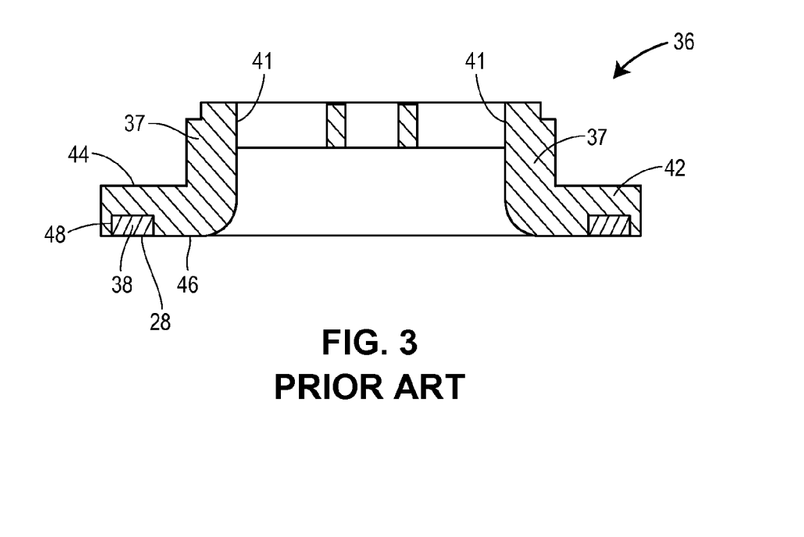
FIG. 3 is a cross-sectional side view of the known valve plug and sealing disk taken along the lines A-A of FIG. 2.

Referring now to FIGS. 2 and 3, respectively, a top view and a cross-sectional view of the disk holder 36 of the mounting subassembly 32 FIG. 1 taken along the line A-A of FIG. 2 are depicted. As illustrated therein, the plug or disk holder 36 includes the cylindrical body 37 having a flange 42 extending radially therefrom. The flange 42 includes a top surface 44 that abuts a bottom surface of the mounting member 34 (FIG. 1) and a bottom surface 46 that includes an annular recess 48 for receiving the sealing disk 38 having the sealing surface 28. The sealing disk 38 may include a generally ring-shaped disk made of resilient material, such as polyurethane, and may be fixed or bonded to the disk holder (or plug) 36 with an adhesive, for example.

Currently cast polyurethane sealing disks 38, however, often lack sufficient bonding strength at high pressure drops and low flows, resulting in bonding failure between the disk holder 36 and the sealing disk 38, and, therefore, failure of the sealing disk 38 and the control member assembly 24 in general. As such, the performance of the regulator 10 is compromised. While other methods to secure the sealing disk 38 to the disk holder 36 or plug include mechanical methods, such mechanical methods includes a more complicated design, and, therefore, more complex manufacturing issues and increased costs.

SUMMARY OF THE DISCLOSURE

One aspect of the present disclosure includes a valve plug adapted for sealing engagement with a seat, the valve plug comprising a cylindrical body having an annular flange radially extending therefrom, the flange having a top surface, a bottom surface and a circumference. An annular recess is disposed in the bottom surface of the flange, and a plurality of holes is disposed in the top surface of the flange. Each hole of the plurality of holes extends into the annular recess to create a plurality of channels extending between the bottom surface of the flange and the top surface of the flange, and each channel of the plurality of channels includes a stepped portion. An annular groove is disposed between the annular recess and the plurality of holes, the annular groove providing a path between each hole of the plurality of holes that extends along the circumference of the flange. A sealing member is disposed within the at least one channel and includes a top portion, a central portion and a bottom portion. The top portion extends through the annular groove between each hole of the plurality of holes and onto the top surface of the flange on either side of each hole of the plurality of holes, forming a continuous bond on the top surface along the circumference of the flange. The central portion is disposed within the stepped portion of each channel, forming a horizontal bond, and the bottom portion extends through the annular recess forming a sealing surface adapted for sealing engagement with a seating surface of the seat. The continuous and horizontal bonds of the sealing member provide an increased strength of the valve plug, allowing for increased durability in severe applications.

According to another aspect, a valve plug adapted for sealing engagement with a seat is disclosed, the valve plug comprising a cylindrical body having a flange radially extending therefrom, the flange having a top surface, a bottom surface and a circumference. An annular recess is disposed in the bottom surface of the flange, and a plurality of holes is disposed in the top surface of the flange. Each hole of the plurality of holes extends into the annular recess to create a plurality of channels extending between the bottom surface of the flange and the top surface of the flange, and each channel has a stepped portion. A sealing member is disposed within the at least one channel, and the sealing member includes a central portion and a bottom portion. The central portion is disposed within the stepped portion of each channel, such that the central portion forms a horizontal bond. The bottom portion extends through the annular recess forming a sealing surface adapted for sealing engagement with a seating surface of the seat. The horizontal bond in the central portion of the sealing member provides an increased strength of the valve plug, allowing for increased durability in severe applications.

According to yet another aspect, a control device comprises a valve body defining a flow-path for a fluid, a seat ring disposed within the flow-path, and an actuator coupled to the valve body including a control assembly adapted for displacement relative to the seat ring for regulating a flow of the fluid through the flow-path. The control assembly includes a valve plug adapted to sealingly engage the seat ring, and the valve plug comprises a cylindrical body having an annular flange radially extending therefrom, the flange having a top surface, a bottom surface and a circumference. An annular recess is disposed in the bottom surface of the flange, and a plurality of holes is disposed in the top surface of the flange. Each hole of the plurality of holes extends into the annular recess to create a plurality of channels extending between the bottom surface of the flange and the top surface of the flange, and each channel has a stepped portion. An annular groove is disposed between the annular recess and the plurality of holes, such that the annular groove provides a path between each hole of the plurality of holes that extends along the circumference of the flange. A sealing member is disposed within each channel of the plurality of channel, and the sealing member includes a top portion, a central portion, and a bottom portion. The top portion extends through the annular groove between each hole of the plurality of holes and onto the top surface of the flange on either side of each hole of the plurality of holes, forming a continuous bond on the top surface along circumference of the flange. The central portion is disposed within the stepped portion of each channel, forming a horizontal bond, and the bottom portion extends through the annular recess forming a sealing surface adapted for sealing engagement with a seating surface of the seat.

DETAILED DESCRIPTION OF THE DISCLOSURE

Figure 4:
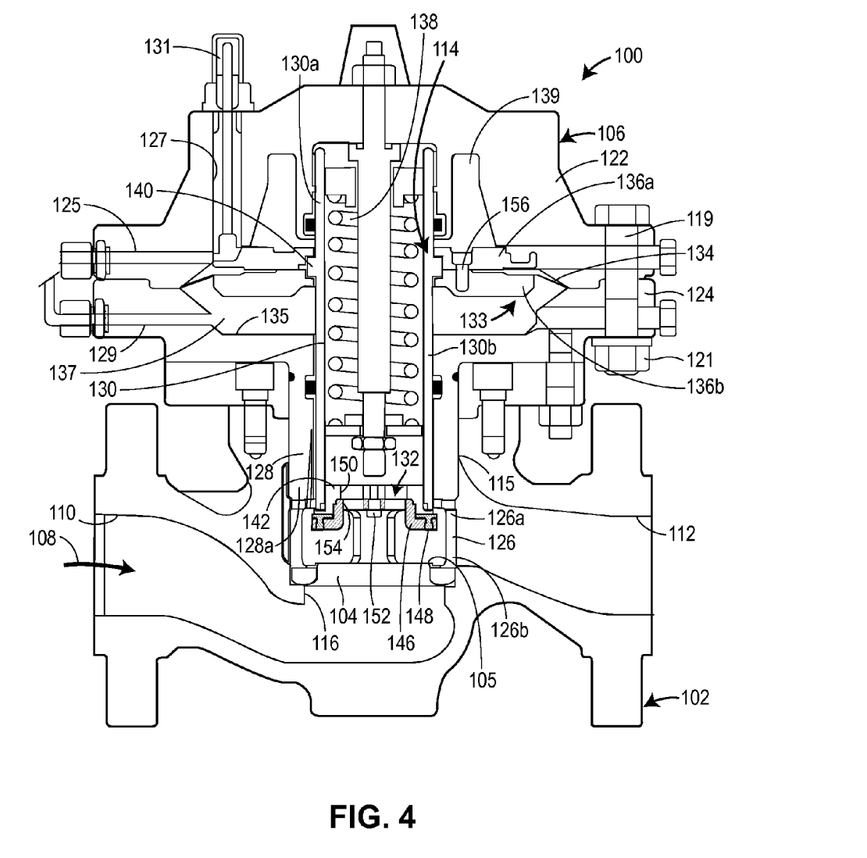
FIG. 4 is a cross-sectional side view of a regulator assembly incorporating a valve plug having a sealing member constructed in accordance with the principles of the present disclosure.

Referring to FIG. 4, a control device in accordance with the principles of the present disclosure includes a pressure regulator 100. The pressure regulator 100 generally includes a valve body 102, a seat ring 104, and an actuator 106. The valve body 102 defines a flow-path 108 extending between an inlet 110 and an outlet 112, and further defines a throat 116 also between the inlet 110 and the outlet 112. The actuator 106 includes a control assembly 114 that is moveable between an open position, as is shown in FIG. 1, and a closed position, wherein the control assembly 114 engages the seat ring 104. Movement of the control assembly 114 occurs in response to fluctuations in the pressure of the fluid traveling through the flow-path 108. Accordingly, the position of the control assembly 114 relative to the seat ring 104 affects a flow capacity of the pressure regulator 100.

The actuator 106, as stated above, includes the control assembly 114 and additionally, an upper actuator casing 122, a lower actuator casing 124 and a plurality of pins 126. The upper and lower actuator casings 122, 124 are secured together by at least one threaded fastener 119 and corresponding nut 121. The upper actuator casing 122 defines a first control inlet 125 and a travel chamber 127. The travel chamber 127 contains a travel indicator 131, which indicates the position of the control assembly 114 within the actuator 106. The lower actuator casing 124 defines a second control inlet 129.

In cooperation, the upper and lower actuator casings 122, 124 define a cavity 135 including a hollow neck 128. The hollow neck 128 includes a lower portion 128a disposed within an actuator opening 115 in the valve body 102. As identified in FIG. 4, the plurality of pins 126 have first ends 126a fixed to the lower portion 128a of the hollow neck 128 and second ends 126b located distally to the lower portion 128a of the hollow neck 128. In the form illustrated, the first ends 126a are threaded into bores formed in the hollow neck 128. The second ends 126b engage the seat ring 104. Accordingly, the pins 126 and the stepped portion 118 of the throat 116 sandwich and axially locate and secure the seat ring 104 in the valve body 102. While the regulator 100 has been described as including a plurality of pins 126 locating the seat ring 104 relative to the valve body 102, an alternate form of the regulator 100 may include a cage disposed in the throat 116 to locate the seat ring 104. In another form, the seat ring 104 may be threaded, adhered, or otherwise fixed to the valve body 102.

Still referring to FIG. 4, the control assembly 114 includes a tubular member 130, a mounting subassembly 132, and a reaction subassembly 133. The tubular member 130 includes an upper end 130a disposed within the cavity 135 and a lower end 130b disposed within the hollow neck 128. The upper end 130a of the tubular member 130 is open and includes a circumferential flange 140. The lower end 130b of the tubular member 130 is open and accommodates the mounting subassembly 132.

Figure 5:
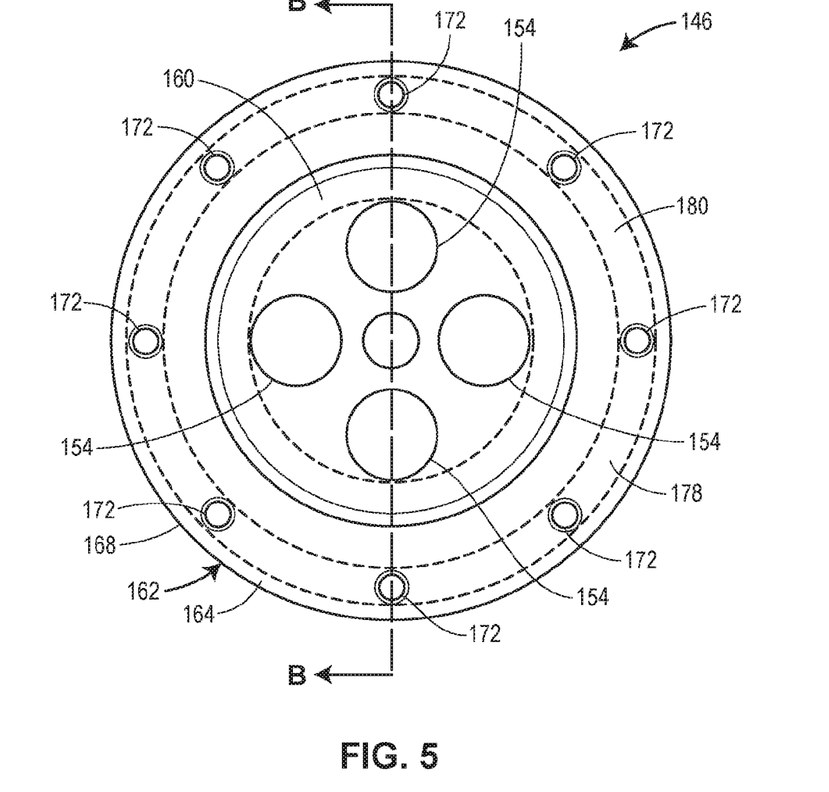
FIG. 5 is top view of the valve plug of FIG. 4.

Still referring to FIG. 4, the mounting subassembly 132 includes a mounting member 142, a plug 146, and a sealing member 148 disposed within the plug 146, as described in more detail below. In the disclosed form, the mounting member 142 includes a generally cylindrical body threaded into the open lower end 130b of the tubular member 130 and defining at least one through-bore 150. The at least one through-bore 150 is generally axially aligned with the tubular member 130. The plug 146 also includes a generally cylindrical body 160 (FIG. 6) fixed to the mounting member 142 with a fastener 152 and comprises a metal material. In the form illustrated, the fastener 152 includes a threaded fastener. Similar to the mounting member 142, the plug 146 also defines at least one through-bore 154, and in one example, four through-bores 154 (FIG. 5). The at least one through-bore 154 of the plug 146 has a diameter substantially identical to a diameter of the through-bore 150 in the mounting member 142 and is axially aligned therewith.

Referring now to the upper portion of the regulator 100 depicted in FIG. 2, the reaction subassembly 133 includes a diaphragm 134, an upper diaphragm plate 136a and a lower diaphragm plate 136b. The upper and lower diaphragm plates 136a, 136b are clamped onto the circumferential flange 140 of the tubular member 130. The diaphragm plates 136a, 136b are secured together via a fastener 156, thereby fixing the tubular member 130 and the diaphragm plates 136a, 136b together. Additionally, the diaphragm plates 136a, 136b sandwich a radially inward portion of the diaphragm 134. A radially outward portion of the diaphragm 134 is fixed between the upper and lower actuator casings 122, 124. A spring 138 is disposed within the tubular member 130. In the form disclosed, the spring 138 biases the control assembly 114 including the diaphragm plates 136a, 136b, the tubular member 130, and the mounting subassembly 132 to a predetermined position relative to the actuator casings 122, 124.

In general, when the regulator assembly 100 is installed within a fluid process control system, the control assembly 114 is able to reciprocally displace within the cavity 135 and hollow neck 128 of the actuator 106 according to a pressure of the fluid traveling through the valve body 102. Specifically, fluid flows from the inlet 110 of the valve body 102 and through the throat 116. Once the fluid passes through the throat 116, a substantial portion of the fluid flows to the outlet 112 while the remainder flows through the through-bores 150, 154 in the mounting member 142 and the valve plug 146, respectively. That portion of the fluid continues to flow through the tubular member 130. The portion of the fluid that flows through the valve body 102 and to the outlet 112 also flows back into the fluid process control system. Specifically, in one form, a portion of the pressure of the fluid at the outlet 112 is bled off into another fluid line (not shown) and may be directed back into the fluid process control system to supply, for example, a pilot system, via a fluid line (not shown).

The regulator assembly 100 uses inlet pressure coming through second control inlet 129 as the operating medium, which is reduced through pilot (not shown) operation to load a lower chamber 137. An upper chamber 139 is supplied with pressure coming from another source, such as pre-regulator Type SA/2, through first control inlet 125, which reduces the inlet pressure to approximately the constant value of the outlet pressure. The pressure in the upper chamber 139 opposes the force of the main spring 138, the force than tends to open the regulator assembly 100. Outlet or downstream pressure opposes a pilot control spring (not shown).

When the outlet pressure drops below the setting of the pilot control spring (not shown), additional loading pressure is applied to the lower chamber 137, opening the sealing member 148 of the valve plug 146 and supplying the required flow to the downstream system. When the outlet pressure increases, the loading pressure applied to the lower chamber 137 is reduced, and pressure in the upper chamber 139 will force the regulator assembly 100 to close.

Figure 6:
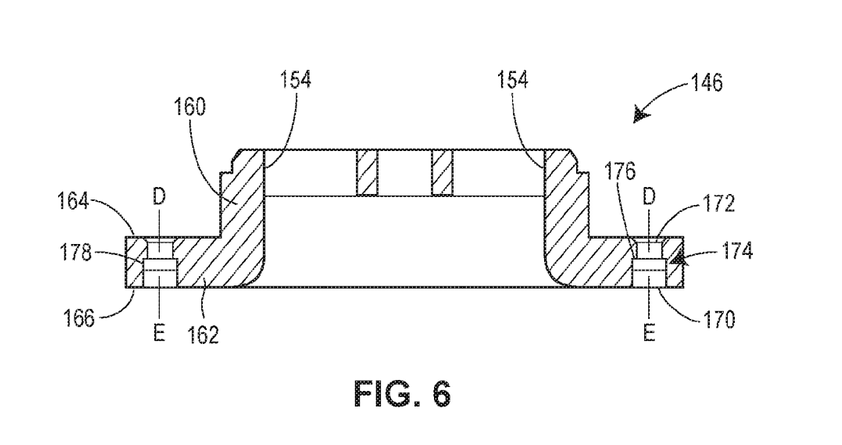
FIG. 6 is a cross-sectional view of the valve plug of FIG. 5, taken along the lines B-B of FIG. 5.

Referring now to FIGS. 5 and 6, FIG. 5 depicts a top view of the plug 146 of FIG. 4 only, and not the valve plug 146 having the sealing member 148 disposed therein, and FIG. 6 depicts a side cross-sectional view of the valve plug 146 of FIG. 5, taken along the lines B-B of FIG. 5. As shown therein, the plug 146 includes a cylindrical body 160 having an annular flange 162 radially extending therefrom. The annular flange 162 includes a top surface 164, a bottom surface 166, and a circumference 168.

As depicted in FIG. 6, the plug 146 further includes an annular recess 170 disposed in the bottom surface 166 of the flange 162. The annular recess includes a width and a longitudinal axis E. In addition, at least one hole 172 is disposed on a top surface 164 of the flange 162. The at least one hole 172 extends into the annular recess 170 to create at least one channel 174 extending between the bottom surface 166 and the top surface 164 of the annular flange 162. The at least one hole 172 includes a diameter that is less than the width of the annular recess 170, such that the at least one channel 174 includes a stepped portion 176. In addition, the at least one hole 172 includes a longitudinal axis D that is aligned with the longitudinal axis E of the annular recess 170.

In one example, the at least one hole 172 comprises a plurality of holes 172, and the at least one channel 174 comprises a plurality of channels 174. More specifically, each hole 172 of the plurality of holes 172 extends into the annular recess 170 to create a plurality of channels 174, wherein each channel of the plurality of channels 174 corresponds to each hole 172 of the plurality of holes 172. Moreover, each channel 174 of the plurality of channels includes the stepped portion 176. In addition, in another example, the distance between each hole 172 of the plurality of holes 172 disposed along the circumference 168 of the flange 162 is the same or an equal value.

While each hole 172 is depicted as generally circular in diameter and cylindrical in shape, one of ordinary skill in the art will appreciate that each hole 172 may alternatively take the form of various other shapes and still fall within the scope of the present disclosure. For example, such alternative shapes of the holes 172 include a rectangular or other similarly shaped slot, a triangular shape, a semi-circular shape, a grid, other various other geometric shapes and still fall within the scope of the disclosure.

In one example, the valve plug 146 further includes an annular groove 178 disposed between the annular recess 170 and the plurality of holes 172. The annular groove 178 provides a path 180 between each hole 172 of the plurality of holes 172 that extends along the circumference 168 of the flange 162. In one example, the groove includes a depth of about 2 mm. As explained in more detail below, the path of the annular groove 178 allows polyurethane or other similar material of the sealing member 148 to flow between each hole 172 of the plurality of holes 172 during casting. This creates a continuous polyurethane bond between each hole 172 on the top surface 164 of the flange 162 along the circumference 168 of the flange 162.

Figure 7:
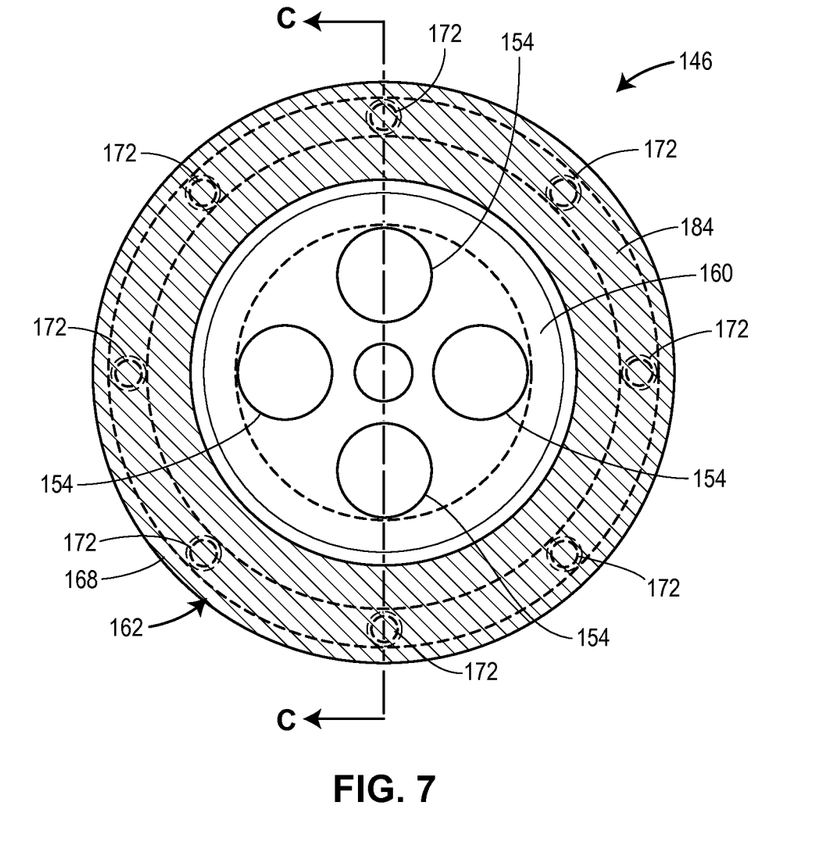
FIG. 7 is a top view of the valve plug and sealing member of FIG. 4.
Figure 8:
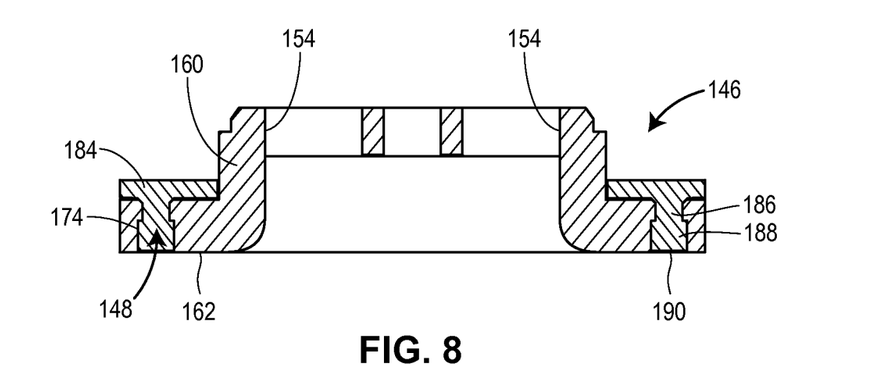
FIG. 8 is a cross-sectional view of the valve plug and sealing member of FIG. 7, taken along the lines C-C of FIG. 7.

More specifically, and referring now to FIGS. 7 and 8, the sealing member 148 is disposed within the at least one channel 174 of the valve plug 146. The sealing member 148 includes a top portion 184 that extends through the annular groove 178 (FIG. 5) between each hole 172 of the plurality of holes 172 and onto the top surface 164 (FIG. 5) of the flange 162 on either side of each hole 172 of the plurality of holes 172. As a result, a continuous bond on the top surface 164 (FIG. 5) of the flange 162 along the circumference 168 of the flange 162 is formed. The sealing member 148 further includes a central portion 186 disposed within the stepped portion 176 of each channel 174 of the plurality of channels 174. A horizontal bond is formed across the stepped portion 176 of each channel 174. Still further, the sealing member 148 also includes a bottom portion 188 that extends through the annular recess 170 and forms a sealing surface 190. The sealing surface 190 is adapted to sealingly engage a seating surface 105 of the seat 104.

Thus, both the continuous bond in the top portion 184 of the sealing member 148 and the horizontal bond in the central portion 186 of the sealing member 148 together provide an increased strength of the valve plug 146, allowing for increased durability in severe applications. Such severe applications include high pressure drop and low-flow conditions or contaminants in the fluid, for example. In addition, it is further believed that each hole 172 of the plurality of holes 172 will provide an escape path for gas that enters the material of the sealing member 148 during decompression, increasing the life of the sealing member 148 and valve plug 146.

In one example, the material of the sealing member 148 is polyurethane. However, one of ordinary skill in the art will understand that various other materials having properties similar to polyurethane, for example, may alternatively be used alone or in combination with polyurethane and still fall within the scope of the present disclosure.

Said another way, the new valve plug and sealing member design allows a robust sealing material, such as polyurethane, to be used in severe service conditions. In particular, the holes 172 in the top surface 164 of the annular flange 162 allow polyurethane to flow through the holes 172 and to the top surface 164 of flange 162 of the valve plug 146. This results in a bond that has a large area disposed on the top surface 164 of the flange 162 compared to, for example, the adhesive bond between the sealing disk and valve plug of FIG. 1 and in other conventional designs. Moreover, because the holes 172 are staged such that the stepped portion 176 or shelf exists for additional horizontal bonding, the valve plug 142 has additional horizontal bonding strength in each channel 174 surrounding the circumference 168 of the flange 162 for severe applications. Such additional horizontal bonding over the stepped portion 176 of each channel 174 is in contrast to a straight hole, which would only have vertical bonding.

Thus, the valve plug and sealing member design of FIGS. 4-8 includes polyurethane material of the sealing member 146 that goes all the way through each channel 174, such that polyurethane material is disposed on both the top surface 164 and the bottom surface 166 of the annular flange 162 of the valve plug 146. Alternatively, a valve plug and sealing member design could have the polyurethane sealing member 148 in only holes 172 and channels 174. While not depicted in the figures, such a bond would still be stronger than example adhesive bonds in prior art designs because of the holes 172 and their stepped portions 176 or staging.

In light of the foregoing, the description of the present disclosure should be understood as merely providing examples of the present invention and, thus, variations that do not depart from the gist of the invention are intended to be within the scope of the invention.

What is claimed:

1. A valve plug adapted for sealing engagement with a seat, the valve plug comprising:
    a cylindrical body having an annular flange radially extending therefrom, the flange having a top surface, a bottom surface and a circumference;
    an annular recess disposed in the bottom surface of the flange;
    a plurality of holes disposed in the top surface of the flange, each hole of the plurality of holes extending into the annular recess to create a plurality of channels extending between the bottom surface of the flange and the top surface of the flange, and each channel of the plurality of channels including a stepped portion;
    an annular groove disposed between the annular recess and the plurality of holes, the annular groove providing a path between each hole of the plurality of holes that extends along the circumference of the flange; and
    a sealing member disposed within the at least one channel, the sealing member having a top portion that extends through the annular groove between each hole of the plurality of holes and onto the top surface of the flange on either side of each hole of the plurality of holes, forming a continuous bond on the entire top surface along and extending to the circumference of the flange, a central portion disposed within the stepped portion of each channel, forming a horizontal bond, and a bottom portion that extends through the annular recess forming a sealing surface adapted for sealing engagement with a seating surface of the seat,
    wherein the continuous and horizontal bonds of the sealing member provide an increased strength of the valve plug, allowing for increased durability in severe applications, and
    wherein the cylindrical body is fixed to a mounting member such that the top portion of the sealing member contacts the mounting member.

2. The valve plug of claim 1, wherein the sealing member comprises polyurethane, and the valve plug comprises a metal material.

3. The valve plug of claim 1, further comprising at least one bore formed within the cylindrical body and disposed radially inward of the sealing member.

4. The valve plug of claim 1, wherein the annular recess includes a width and each hole of the plurality of holes includes a diameter that is less than the width of the annular recess, thereby forming the stepped portion in each channel of the plurality of channels.

5. The valve plug of claim 1, wherein each hole of the plurality of holes has a longitudinal axis and the annular recess includes a longitudinal axis that is aligned with the longitudinal axis of each hole.

6. The valve plug of claim 1, wherein the distance between each hole of the plurality of holes disposed in the top surface of the flange is the same.

7. The valve plug of claim 1, wherein the groove includes a depth of about 2 mm, and the groove extends along the circumference of the flange.

8. A valve plug adapted for sealing engagement with a seat, the valve plug comprising:
    a cylindrical body having a flange radially extending therefrom, the flange having a top surface, a bottom surface and a circumference;
    an annular recess disposed in the bottom surface of the flange;
    a plurality of holes disposed in the top surface of the flange, each hole of the plurality of holes extending into the annular recess to create a plurality of channels extending between the bottom surface of the flange and the top surface of the flange, each channel having a stepped portion; and
    a sealing member disposed within the at least one channel, the sealing member having a top portion, a central portion disposed within the stepped portion of each channel, the central portion forming a horizontal bond, and a bottom portion that extends through the annular recess forming a sealing surface adapted for sealing engagement with a seating surface of the seat,
    wherein the horizontal bond in the central portion of the sealing member provides an increased strength of the valve plug, allowing for increased durability in severe applications, and
    wherein the cylindrical body is fixed to a mounting member such that the top portion of the sealing member contacts the mounting member.

9. The valve plug of claim 8, wherein the annular recess includes a width and each hole of the plurality of holes includes a diameter that is less than the width of the annular recess, thereby forming the stepped portion in each channel of the plurality of channels.

10. The valve plug of claim 8, wherein the sealing member comprises polyurethane, and the valve plug comprises a metal material.

11. The valve plug of claim 8, further comprising at least one bore formed within the cylindrical body and disposed radially inward of the sealing member.

12. The valve plug of claim 8, wherein each hole of the plurality of holes has a longitudinal axis, and the recess includes a longitudinal axis that is aligned with the longitudinal axis of each hole.

13. The valve plug of claim 8, wherein the distance between each hole of the plurality of holes disposed in the top surface of the flange is the same.

14. A control device, comprising:
a valve body defining a flow-path for a fluid;
a seat ring disposed within the flow-path; and
an actuator coupled to the valve body including a control assembly adapted for displacement relative to the seat ring for regulating a flow of the fluid through the flow-path, the control assembly including a mounting member and a valve plug adapted to sealingly engage the seat ring, the valve plug comprising:
a cylindrical body having an annular flange radially extending therefrom, the flange having a top surface, a bottom surface and a circumference,
an annular recess disposed in the bottom surface of the flange,
a plurality of holes disposed in the top surface of the flange, each hole of the plurality of holes extending into the annular recess to create a plurality of channels extending between the bottom surface of the flange and the top surface of the flange, each channel having a stepped portion,
an annular groove disposed between the annular recess and the plurality of holes, the annular groove providing a path between each hole of the plurality of holes that extends along the circumference of the flange, and
a sealing member disposed within each channel of the plurality of channels, the sealing member having a top portion that extends through the annular groove between each hole of the plurality of holes and onto the top surface of the flange on either side of each hole of the plurality of holes, forming a continuous bond on the top surface along circumference of the flange, a central portion disposed within the stepped portion of each channel, forming a horizontal bond, and a bottom portion that extends through the annular recess forming a sealing surface adapted for sealing engagement with a seating surface of the seat,
wherein the cylindrical body is fixed to the mounting member such that the top portion of the sealing member contacts the mounting member.

15. The control device of claim 14, wherein the annular recess of the valve plug has a width and each hole of the plurality of holes has a diameter that is less than the width of the annular recess, forming the stepped portion in each channel.

16. The control device of claim 14, wherein the sealing member comprises polyurethane, and the valve plug comprises a metal material.

17. The control device of claim 14, further comprising at least one bore formed within the cylindrical body of the valve plug and disposed radially inward of the sealing member.

18. The control device of claim 14, wherein each hole of the plurality of holes has a longitudinal axis and the recess includes a longitudinal axis that is aligned with the longitudinal axis of each hole.

19. The control device of claim 14, wherein the distance between each hole of the plurality of holes disposed in the top surface of the flange is the same.

20. The control device of claim 14, wherein the groove includes a depth of about 2 mm, and the groove extends along the circumference of the flange.

* * * * *